(12) United States Patent
Nakamura

(10) Patent No.: US 8,040,225 B2
(45) Date of Patent: Oct. 18, 2011

(54) ELECTRONIC AUTHENTICATION SYSTEM FOR MOTORCYCLE

(75) Inventor: Tsuyoshi Nakamura, Shizuoka (JP)

(73) Assignee: Suzuki Motor Corporation, Hamamatsu-Shi, Shizuoka (JP)

( * ) Notice: Subject to any disclaimer, the term of this patent is extended or adjusted under 35 U.S.C. 154(b) by 1093 days.

(21) Appl. No.: 11/697,435

(22) Filed: Apr. 6, 2007

(65) Prior Publication Data

US 2007/0247280 A1 Oct. 25, 2007

(30) Foreign Application Priority Data

Apr. 6, 2006 (JP) ................................. 2006-105644
Apr. 6, 2006 (JP) ................................. 2006-105646

(51) Int. Cl.
*B60R 25/10* (2006.01)
*B60R 25/00* (2006.01)
*G05B 19/00* (2006.01)
*G05B 23/00* (2006.01)
*G06F 7/00* (2006.01)
*G06F 7/04* (2006.01)
*G08B 29/00* (2006.01)
*G08C 19/00* (2006.01)
*H04B 1/00* (2006.01)
*H04B 3/00* (2006.01)
*H04Q 1/00* (2006.01)
*H04Q 9/00* (2006.01)

(52) U.S. Cl. ............. 340/426.17; 340/426.13; 340/5.64; 340/5.72

(58) Field of Classification Search ............. 340/426.13, 340/426.17, 5.64, 5.72
See application file for complete search history.

(56) References Cited

U.S. PATENT DOCUMENTS

| 5,634,358 | A | * | 6/1997 | Myers ............................. 70/233 |
| 5,646,701 | A | * | 7/1997 | Duckworth et al. ..... 340/825.69 |
| 6,727,800 | B1 | * | 4/2004 | Dutu ............................. 340/5.53 |
| 2005/0099264 | A1 | * | 5/2005 | Konno et al. .................. 340/5.64 |
| 2005/0168435 | A1 | * | 8/2005 | Reed et al. ..................... 345/156 |
| 2005/0200156 | A1 | * | 9/2005 | Michisaka et al. ......... 296/97.22 |
| 2005/0242929 | A1 | * | 11/2005 | Onishi et al. ............. 340/426.17 |
| 2006/0244575 | A1 | * | 11/2006 | Ramirez et al. .......... 340/426.35 |
| 2007/0285272 | A1 | * | 12/2007 | Umeda et al. ................. 340/825 |

FOREIGN PATENT DOCUMENTS

| JP | 1-62986 | U |   | 4/1989 |
| JP | 7-112680 | A |   | 5/1995 |
| JP | 09053352 |   | * | 2/1997 |
| JP | 9-71275 | A |   | 3/1997 |
| JP | 2001-213370 | A |   | 8/2001 |
| JP | 2001-342768 | A |   | 12/2001 |
| JP | 2002-205670 | A |   | 7/2002 |
| JP | 2003-206664 | A |   | 7/2003 |

(Continued)

*Primary Examiner* — Jennifer Mehmood
*Assistant Examiner* — Andrew Bee
(74) *Attorney, Agent, or Firm* — McDermott Will & Emery LLP

(57) ABSTRACT

Aimed at providing an electronic authentication system for a motorcycle excellent in the handlability and operability, operations of turning an ignition knob, and of opening a accommodation lid and a fuel lid, disposed in the front portion of the vehicle, are permitted, when agreement of ID information was judged. The steering bar was made unlockable by operating the ignition knob after agreement of the ID information was judged, and the seat was made unlockable by further operating the ignition knob.

9 Claims, 14 Drawing Sheets

FOREIGN PATENT DOCUMENTS

| | | |
|---|---|---|
| JP | 2004-122816 A | 4/2004 |
| JP | 2005-104197 A | 4/2005 |
| JP | 2005-112048 A | 4/2005 |
| JP | 2005-119421 A | 5/2005 |
| JP | 2005-207038 A | 8/2005 |

* cited by examiner

F I G. 13
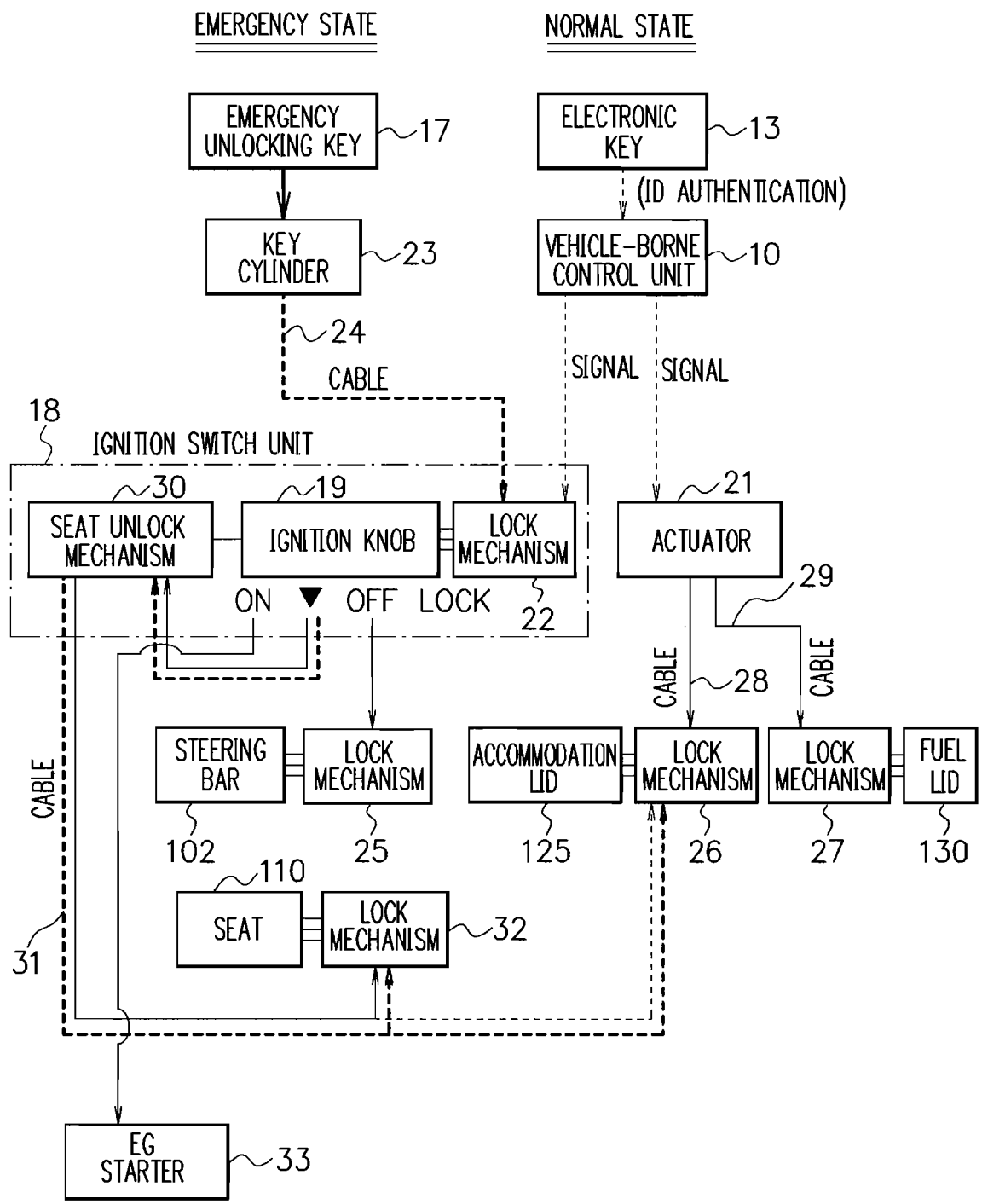

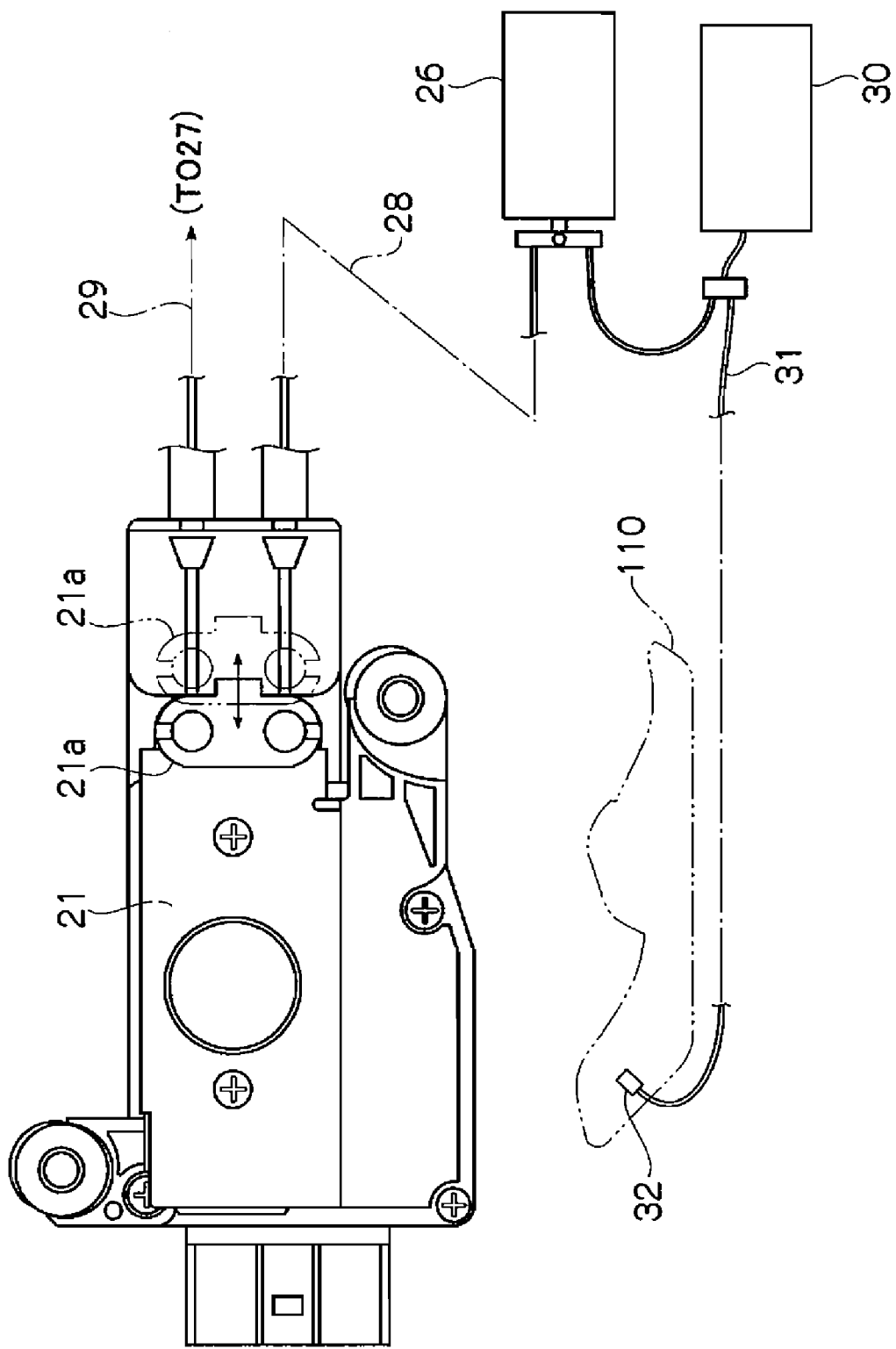

ELECTRONIC AUTHENTICATION SYSTEM FOR MOTORCYCLE

CROSS-REFERENCE TO RELATED APPLICATIONS

This application is based upon and claims the benefit of priority from the prior Japanese Patent Application Nos. 2006-105644, filed on Apr. 6, 2006 and 2006-105646, filed on Apr. 6, 2006, the entire contents of which are incorporated herein by reference.

BACKGROUND OF THE INVENTION

1. Field of the Invention

The present invention relates to an electronic authentication system for motorcycles typically for scooter-type vehicles.

2. Description of the Related Art

Motorcycles equipped with electronic authentication systems have been known. The electronic authentication system is such as allowing operation of a vehicle only when an authentication ID sent from a portable electronic key owned by a user according to a predetermined operation to the vehicle is judged as being authorized, typically by unlocking the steering bar.

A conventional technology regarding this sort of electronic authentication system is disclosed typically in Japanese Patent Application Laid-Open No. 2004-122816; Japanese Patent Application Laid-Open No. 2005-119421; and Japanese Patent Application Laid-Open No. 2005-207038.

The technique disclosed in Japanese Patent Application Laid-Open No. 2004-122816 is configured so as to start the electronic authentication by operating a vehicle-borne start switch, in which the steering bar and the seat are unlocked when an authorized authentication ID was acquired, and the engine is started by operating the main switch after they are unlocked.

The technique disclosed in Japanese Patent Application Laid-Open No. 2005-119421 is aimed at motorcycles capable of unlocking the steering bar and controlling operation of the engine by turning an operation knob provided on the cylinder lock, configured so that the turning operation of the operation knob locked with a locking solenoid is permitted when an authorized authentication ID was acquired, and by operating a seat unlock switch after the authentication.

The technique disclosed in Japanese Patent Application Laid-Open No. 2005-207038 is aimed at motorcycles capable of unlocking the steering bar and controlling operation of the engine by turning an operation knob provided on the cylinder lock, configured so that the turning operation of the operation knob locked with a locking solenoid is permitted when an authorized authentication ID was acquired, and by independently operating an unlock switch after the authentication to thereby unlock the seat, and by further independently operating a separate unlock switch to thereby unlock a accommodation portion provided on the front side of the vehicle.

The accommodation portion is provided therein with an operation component for unlocking the oil-supply lid provided on the lower side of the vehicle, so as to allow the user to operate the operation component only when the accommodation portion is unlocked and the lid component is kept open.

The conventional technique disclosed in , Japanese Patent Application Laid-Open No. 2004-122816 however, suffers from a problem in that the seat cannot be unlocked unless otherwise the start switch is operated. Therefore, accommodation of a helmet or the like into a commodity accommodation under the seat, when the vehicle is parked after driving, needs unlocking of the seat by operating the start switch, making the operation inconvenient. Even if the unlocking of the seat is unnecessary, it is anticipated that the user may launch the vehicle while unconsciously leaving the seat unlocked, because the seat is unconditionally unlocked, and this is not recognized as being convenient to use.

The conventional technique disclosed in Japanese Patent Application Laid-Open No. 2005-119421 enables independent operations of unlocking the cylinder lock and unlocking the seat, but the seat unlock switch unlocking the seat and the cylinder lock are separately provided, and the accommodation under the seat is accessible only by separately operating the seat unlock switch, and this is not recognized as being desirable in the operability.

The conventional technique disclosed in Japanese Patent Application Laid-Open No. 2005-207038 needs operation of a plurality of unlock switches after the electronic authentication, again raising inconvenience in operation. Moreover, unlocking of the oil-supply lid is accessible only after unlocking of the accommodation portion, and this is not recognized as being desirable in the operability and handlability in oil supply.

Moreover, the electronic authentication is even inaccessible in case of shortage of voltage of the vehicle-borne battery of a motorcycle equipped with the electronic authentication system. In this case, only possible way of recovering the electronic authentication system is such as replacing or charging the battery, so as to normally operate the vehicle-borne control unit of the electronic authentication system.

The battery is generally provided inside a front leg shield, and located in the front side of the front accommodation of the vehicle. The battery is accessible only by removing the inner wall of the front accommodation, and can be taken out from the vehicle. The electronic authentication system, however, does not operate due to shortage of the battery voltage, and this makes it impossible to open the front accommodation lid component for which the opening/closing operation thereof should be permitted.

Japanese Patent Application Laid-Open No. 2005-119421 describes a mechanism by which the lock solenoid is allowed to operate so as to allow turning of the cylinder lock with the knob, after the authentication. This is also configured so that a seat lock actuator is allowed to operate depending on operation of the seat unlock switch after the authentication, and to enable operation control of the engine with a controller depending on electric conduction of the main switch.

This sort of vehicle is equipped with an emergency unlock key cylinder, and the unlock operation thereof allows a link to turn so as to pull a transmission interlock, and converts a seat catcher from the seat catching state to the seat releasing state. Provision of the emergency unlock key cylinder also enables switching of the seat catcher into the seat releasing state, by either of operation of the seat lock actuator and the unlock operation of the emergency unlock key cylinder.

The conventional mechanism described in Japanese Patent Application Laid-Open No. 2005-119421, however, cannot unlock the steering bar, unless otherwise a predetermined component in the accommodation box under the seat is operated, after unlocking the seat through operation of the emergency unlock key. Operation of the predetermined component results in a control state similar to that established when the authorized ID signal is received, and this raises a problem in that even a person other than the owner of the vehicle can readily steal the whole vehicle by drastically operating the emergency unlock key cylinder.

Moreover, it cannot be said that a desirable level of immobilizer function has not been provided, if the engine start is remained accessible through the emergency unlock key cylinder lock, despite the electronic authentication system is adopted, and this inevitably degrades the crime prevention performance. The emergency unlock key cylinder lock is provided in a second commodity accommodation portion having no lock mechanism, so that the emergency unlock key cylinder lock may be found when someone is picking something in the second commodity accommodation portion.

The present invention is conceived after considering the above-described situation, and an object thereof is to provide an electronic authentication system for a motorcycle excellent in the handlability and operability, and also in antitheft performance or the like.

SUMMARY OF THE INVENTION

The electronic authentication system for a motorcycle of the present invention is such as including a portable transmitter-receiver carried by a user, a control unit installed on a motorcycle body, and an ignition switch unit provided with an ignition knob, the ignition switch unit electrically connected with the control unit, wherein the control unit permits the ignition knob to be rotated from a handle locking position and enables an accommodation box lid to be opened in consequence of matching both identification information stored in the portable transmitter-receiver and the control unit respectively.

The electronic authentication system for a motorcycle of the present invention is also such as further including an emergency unlocking device including a mechanical key, a key cylinder installed on the motorcycle body and a cable connecting the key cylinder and a lock mechanism for locking/unlocking the rotation of the ignition knob, wherein the emergency unlocking device permits the ignition knob to be rotated from the handle locking position in consequence of the emergency unlocking operation without authentication.

According to the present invention, an operation of turning the ignition knob is allowed upon acquisition of the electronic authentication, and also an operation of opening the accommodation box lid component at the front portion of the vehicle is permitted. The accommodation box lid component can therefore be opened whenever it is necessary, provided that it is after the electronic authentication. In this case, there is no need of providing any operation component for removing a banned state of opening operation of the accommodation box lid component other than the ignition knob. In other words, there is no need of separately operating any other operating portion in order to remove the banned state, making the operation simple.

An operation of opening the fuel lid is permitted upon acquisition of the electronic authentication. The fuel lid can therefore be opened whenever it is necessary, provided that it is after the electronic authentication. In this case, there is no need of providing any operation component for removing a banned state of opening operation of the fuel lid other than the ignition knob. In other words, there is no need of separately operating any other operating portion in order to remove the banned state, making the operation simple.

The steering bar is configured as being unlockable by operating the ignition knob after the electronic authentication. The steering bar can, therefore, be unlocked by a series of operations only of the ignition knob. In other words, upon acquisition of the electronic authentication as described in the above, the accommodation box lid component and the fuel lid are unlocked, so that operations for starting the electronic authentication up to unlocking of the steering bar can be conducted by a series of motion, without need of keeping the hands off from the ignition knob in order to operate any other dedicated operation component.

The seat is configured as being unlockable by further operating the ignition knob after the above-described unlocking of the steering bar. The seat can, therefore, be unlocked by a series of operations only of the ignition knob. In other words, upon acquisition of the electronic authentication as described in the above, the accommodation box lid component and the fuel lid are unlocked, so that operations for starting the electronic authentication up to unlocking of the seat can be conducted by a series of motion, without need of keeping the hands off from the ignition knob in order to operate any other dedicated operation component.

The seat is configured as being unlockable through a turning operation under pressing of the ignition knob. By adopting the operation different from an ordinary turning operation, the user is successfully prevented from erroneously unlocking the seat.

The ignition knob has an automatic recovery mechanism steadily energizing the ignition knob to rotate from the seat unlock position towards the steering bar unlock position. Because it is no more necessary to operate the ignition knob once the seat is unlocked, the ignition knob is configured as being returned to the steering bar unlock position with the aid of the automatic recovery mechanism, so as to save labor for the operation. In other words, this is successful to simplify the operations when the user unlocks the seat and takes a helmet or the like out from the commodity housing space under the seat, and then operates the ignition knob to the start operation standby position for starting the engine described later.

The engine can be brought into the engine starting operation standby state, also by turning the ignition knob while keeping it unpressed, in the same direction with the operation of turning it from the steering bar unlock position towards the seat unlock position. For the case where the ignition knob allows only two turning operations in the clock-wise and the counter-clock-wise directions, only a single function can be allocated to the turning operation in a single direction of turning, whereas adoption of the turning operation under pressing described in the above allows allocation of two functions to the turning operation in a single direction of turning. More specifically, in addition to a function of bringing the engine into the starting operation standby state in the normal turning operation while keeping the knob unpressed, another function of unlocking the seat through the operation under pressing can be allocated.

For the case where the ignition knob is configured so as to allow the turning operation both in a pressed manner and in a unpressed manner (turning operation without pressing the ignition knob in the direction of axis of turning) in a single direction as described in the above, the range of turning of the ignition knob from the steering bar unlock position is differed between the range of turning up to the seat unlock position and the range of turning up to the starting operation standby state. By making difference in the range of turning, the user can intuitively and readily understand what kind of operation he or she is engaged, and can be prevented from carrying out incorrect operation.

The accommodation box lid component is configured as having an operator allowing an operation of opening it, in the state allowing the operation of opening, and similarly the fuel lid is configured as having an operator allowing an operation of opening it, in the state allowing the operation of opening. By adopting the operator as described in the above, the accommodation box lid component and the fuel lid are prevented from opening in an unintended manner, even if they are kept in the state of allowing the operation of opening, unless otherwise the operator is operated. For example, the accommodation box lid component and the fuel lid are prevented from unintentionally opening during driving.

According to the present invention, the vehicle-borne operator is made operable through operation of the emergency unlock key, even when the electronic authentication by aid of the portable electronic key, or biological authentication based on body information such as fingerprint, iris, voiceprint or the like is not available, and thereby various operations by aid of the vehicle-borne operator can be carried out in a manner close to the normal operation.

In this case, the steering bar and the seat can be unlocked by operating the vehicle-borne operator similarly to the normal operation, except that only an operation by aid of the emergency unlock key is added.

BY operating the emergency unlock key, both the unlock of the seat and the concomitant opening operation of the accommodation box lid component on the front portion of the vehicle can be allowed, the accommodation box lid component can be opened without relying upon the electronic authentication. In this case, the vehicle-borne operator is connected to the seat unlock mechanism and the opening operation restricting mechanism of the accommodation box lid component respectively using the seat unlock cables, making it possible not only to unlock the seat, but also to unlock the accommodation box lid component.

As has been described in the above, electronic authentication system for a motorcycle of the present invention has a plurality of useful effects as described in the above, and raises excellent effects in the handlability and operability.

BRIEF DESCRIPTION OF THE DRAWINGS

FIG. 13 is a drawing explaining an exemplary system configuration of another embodiment of the present invention;

FIG. 14 is a drawing explaining an exemplary configuration of the actuator according to the embodiment of the present invention.

DETAILED DESCRIPTION OF THE INVENTION

Paragraphs below will describe preferred embodiments of the electronic authentication system for a motorcycle of the present invention, referring to the attached drawings.

Figure 1A:
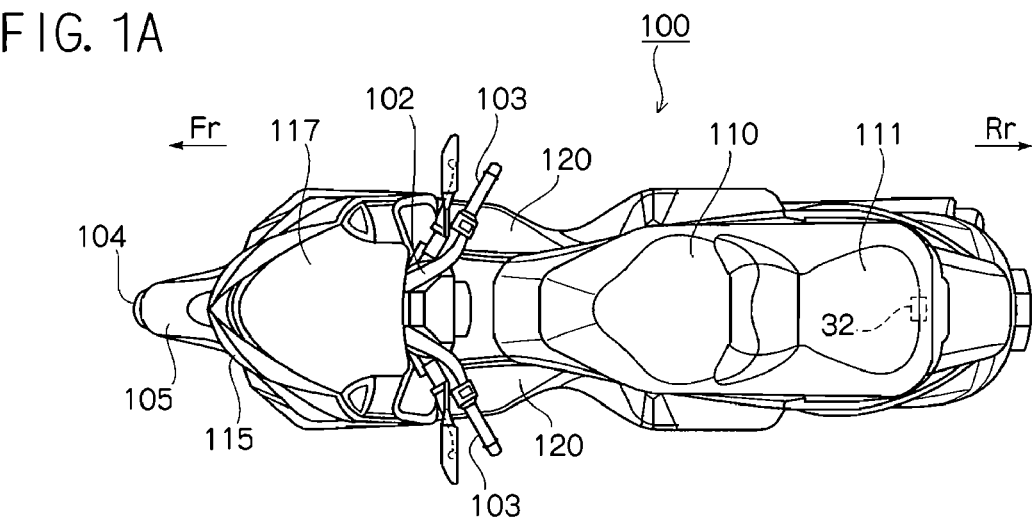
FIGS. 1A and 1B are a plan view and a side elevation, respectively, of a motorcycle according to an embodiment of the present invention.
Figure 1B:
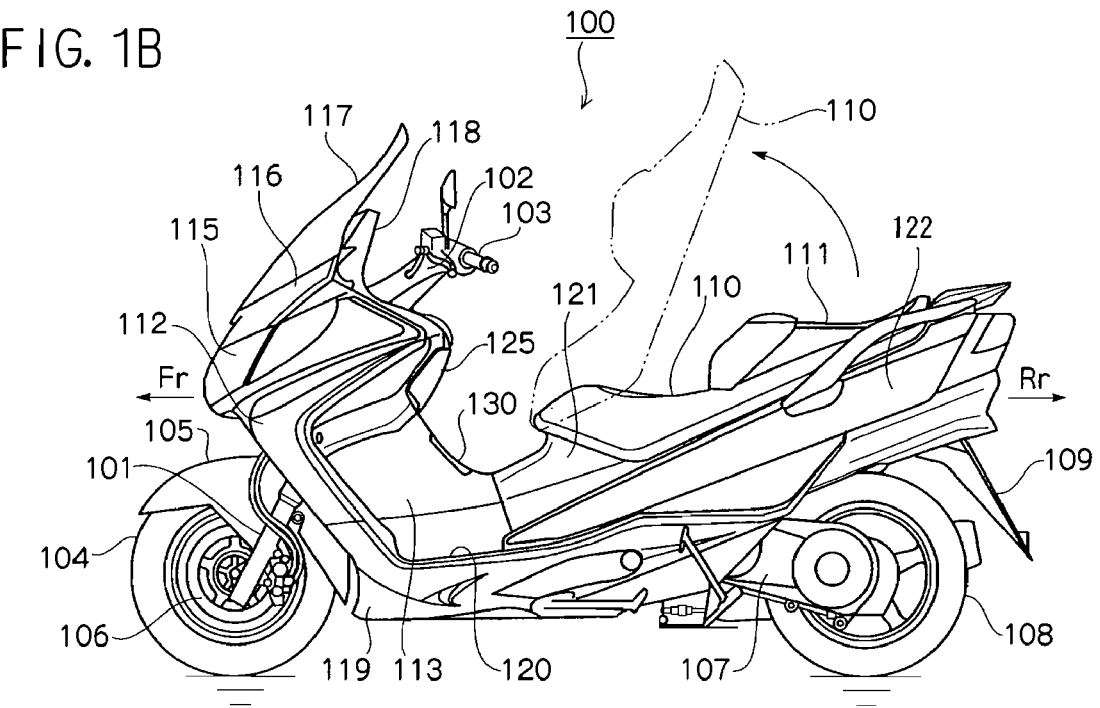

Although the present invention is effectively applicable to various types of motorcycles, this embodiment deals with a so-called, scooter-type vehicle typically shown in FIG. 1. First, an overall configuration of the scooter-type vehicle 100 according to this embodiment will be described. It is to be noted that the front portion and the rear portion of the vehicle will be indicated by arrow Fr and arrow Rr at noticeable points in the individual drawings. In FIG. 1, in the front portion of the vehicle frame composed of steel or aluminum alloy, there is provided two front folks 101 supported as being turnable leftward and rightward by a steering head pipe. At the top end of the front folks 101, a steering bar 102 (handle) is fixed, wherein the steering bar 102 has grips 103 on both ends thereof. At the lower portion of the front folks 101, a front wheel 104 is supported as being rotatable, and a front fender 105 is fixed so as to shade the front wheel 104 from thereabove. The front wheel 104 has a brake disk 106 rotating together with the front wheel 104.

At the rear portion of the vehicle frame, a swing arm 107 is provided as being swingable, and rear shock absorbers are suspended between the vehicle frame and the swing arm 107. One (left) swing arm 107 has incorporated therein a power transmission mechanism composed of a belt type continuously variable transmission or a plurality of gear trains. At the rear end of the swing arm 107, there is supported a rear wheel 108 as being rotatable, wherein the rear wheel 108 is configured as being driven by rotation via the above-described power transmission mechanism. A rear fender 109 is fixed so as to shade the rear wheel 108 from thereabove.

Although not illustrated, the vehicle frame has an engine unit mounted thereon, to which an air-fuel mixture is supplied from an inlet system including an air cleaner and so forth, and from which an exhaust gas after combustion is discharged through an exhaust pipe. In addition, not only the engine unit, but also major constituents of the vehicle including a fuel tank and a radiator and so forth are covered with a vehicle cover described later, ensuring a well-harmonized, stylish appearance of the vehicle as shown in FIG. 1. A driver's seat 110 and a tandem seat 111 are provided in series, as extending from the near center towards the rear side of the vehicle (they are simply referred to as seat 110, hereinafter).

Figure 2:
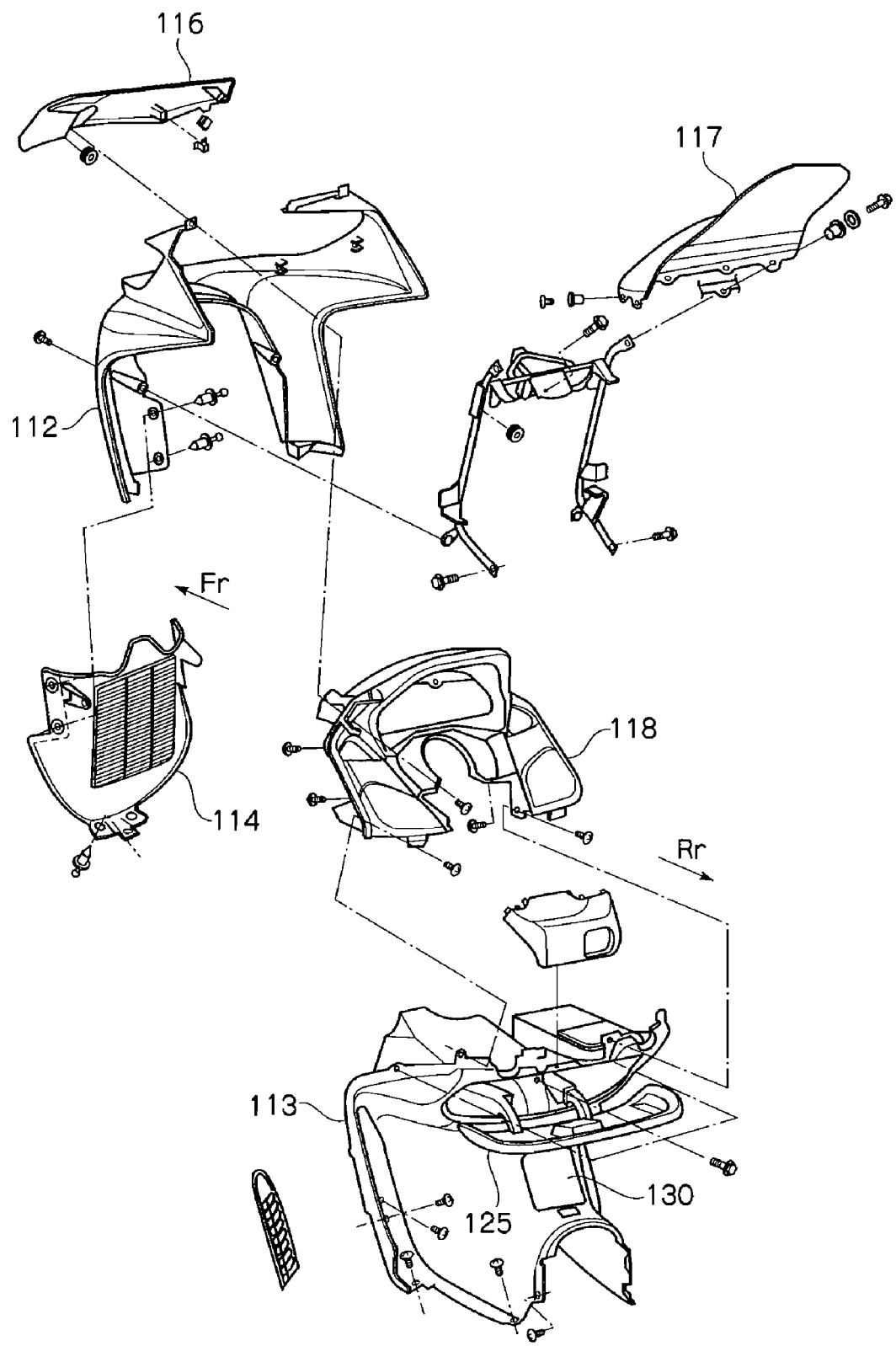
FIG. 2 is an exploded perspective view showing an exemplary configuration of a vehicle body cover of the motorcycle according to the embodiment of the present invention.

Referring now to FIG. 2, the vehicle cover in the front portion of the vehicle is configured so that a front leg shield 112 covering the vehicle front portion from the front side thereof as viewed in the direction of driving, and an inner leg shield 113 covering the vehicle front portion from the seat 110 side, which is the rear side as viewed in the direction of driving, are provided in series, and a lower leg shield 114 is disposed under the front leg shield 112. The front leg shield 112 has a head lamp 115 disposed as being put therein. A wind screen 117 is provided so as to rise up on the front leg shield 112, as being interconnected with a leg shield cover 116. A meter panel 118 is provided on the top of the inner leg shield 113. The front leg shield 112, the inner leg shield 113 and the wind screen 117 are arranged so as to cover at least the driver's legs in the lower body, and the upper body around the steering bar 102, from the front side as viewed in the direction of driving.

Under the inner leg shield 113, a pair of low-floor-type foot rests 120 are provided on both sides thereof and at the front end portion thereof, as being extended towards the rear, so as to allow the driver to sit on the seat 110 while resting his or her feet on the foot rests 120. Between the both foot rests 120, there is provided a floor tunnel portion formed using portions of the inner leg shield 113 and a front frame cover 121, and also provided a under cover 119 so as to cover the lower side of both foot rests 120 as being extended therefrom, wherein the engine unit is disposed in the floor tunnel portion.

The front frame cover 121 is brought into contact with the rear edge of the inner leg shield 113, and rises up towards the lower edge of the seat 110. On the rear side of the front frame cover 121, there are connected a pair of side frame covers 122 and so forth. The vehicle covers described in the above are basically composed of synthetic resins, and attached or fixed to the vehicle frame directly, or indirectly while placing support members such as brackets or the like in between.

Figure 3:
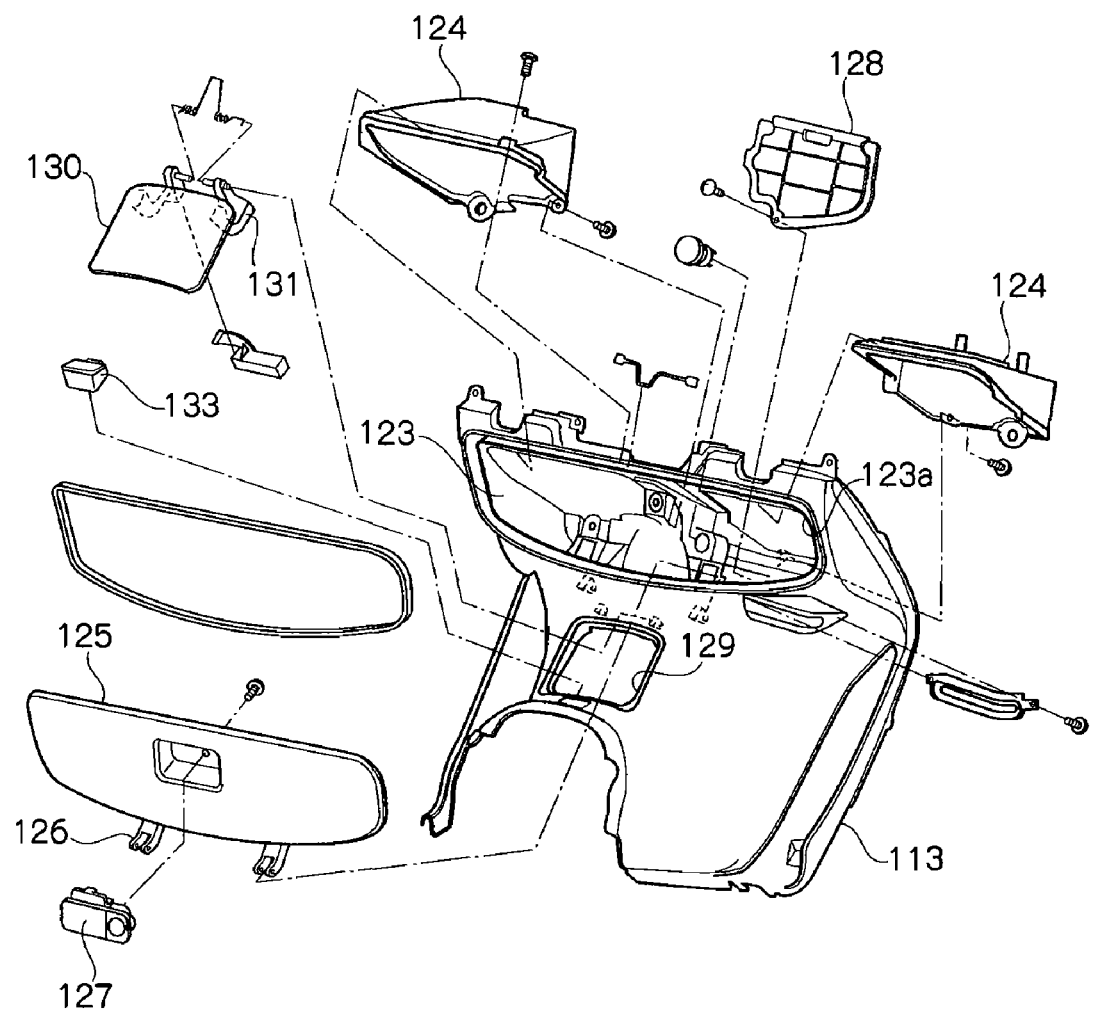
FIG. 3 is an exploded perspective view showing an exemplary configuration of the leg shield and the peripheral components according to the embodiment of the present invention.

Next, FIG. 3 shows an exemplary configuration of the inner leg shield 113 and the peripherals. Simply speaking, a convex tunnel portion is formed thereunder as being projected upward from the portion between the both foot rests 120, and an accommodation box 123 (front housing space) is provided thereabove, as having an opening 123a opened towards the seat 110, as being integrated therewith on the front side. A lateral pair of covers 124 forming the ceiling wall are connected to the top portion of the accommodation box 123, and a front accommodation box lid component 125 (accommodation lid) is attached so as to close the opening 123a of the accommodation box 123, as being freely opened or closed by aid of arms 126 (see also FIG. 4A). The ceiling wall of the accommodation box 123, or the top surface of the covers 124, are formed flat, and is disposed near horizontally. The covers 124 are configured so as to allow thereon mounting of a vehicle-borne control unit 10 (control unit), the accommodation lid 125, and an actuator 21 of the fuel lid 130.

The accommodation lid 125 can be opened through operation of an accommodation box lid opener 127 (operator). In this case, an opening operation restricting mechanism (lock mechanism) restricting opening of the accommodation lid 125 while invalidating the operation of opening by the accommodation box lid opener 127 is provided as described later, and the accommodation lid 125 is allowed to open, when the mechanism is unlocked so as to make the operation of opening by the accommodation box lid opener 127 valid. By providing the accommodation box lid opener 127, the accommodation lid 125 will never open unintentionally, unless otherwise the accommodation box lid opener 127 is operated, so that any unintentional opening of the accommodation lid 125 typically during driving can be prevented. Opening of the accommodation box 123 allows access to the battery (not shown) disposed deep inside thereof, wherein the battery is disposed in front of a battery box lid 128 (on the front side of the vehicle), as being kept unexposed in the normal state.

Figure 4A:
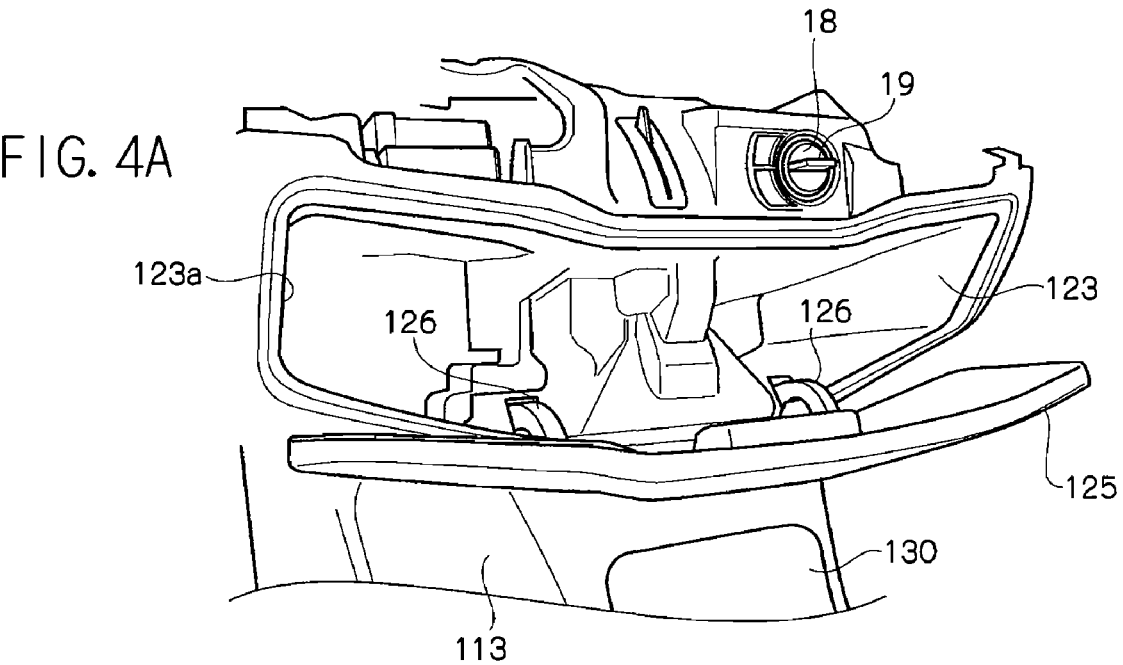
FIGS. 4A and 4B are perspective views showing the accommodation box, and the fuel lid and the peripherals, respectively according to the embodiment of the present invention.
Figure 4B:
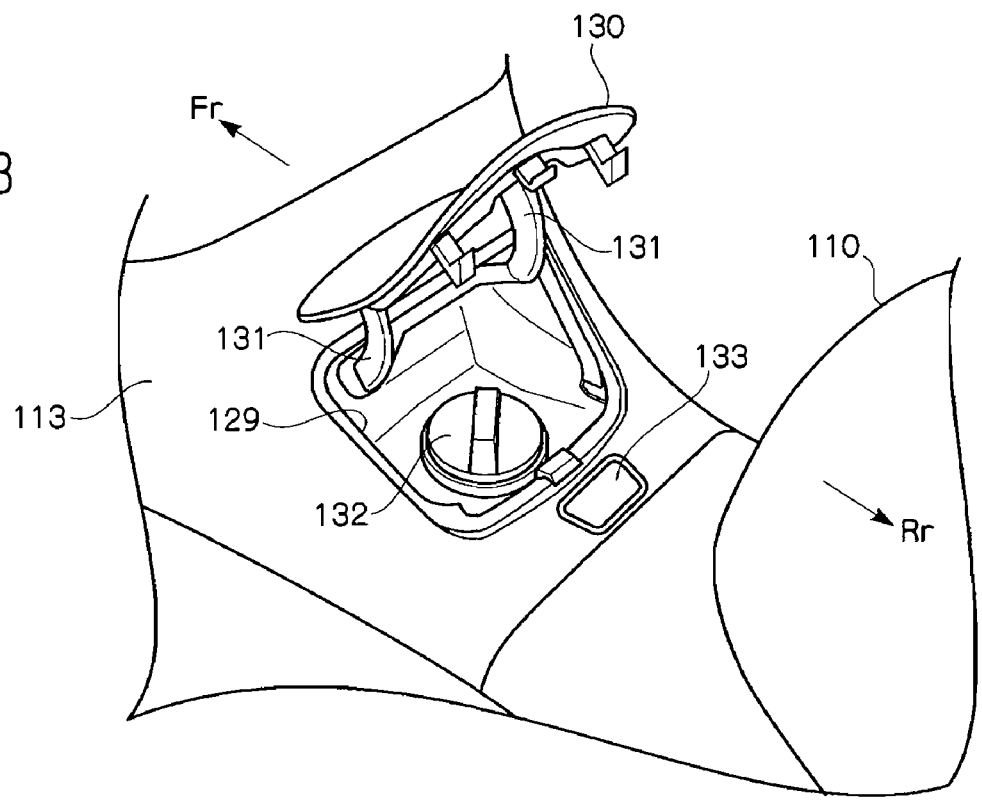

An opening 129 is provided to the top surface of the floor tunnel portion under the accommodation box 123 allowing therethrough access to a fuel filler port of a fuel tank, wherein the opening 129 is closed with a fuel lid component 130 (fuel lid) attached so as to open or close it by aid of arms 131 (see also FIG. 4B). Under the fuel lid 130, there is provided a cap 132 closing the fuel filler port of the fuel tank as shown in FIG. 4B, as being detachable after opening the fuel lid 130.

The fuel lid 130 can be opened by operating a fuel lid opener 133 (operator). In this case, an opening operation restricting mechanism (lock mechanism) restricting opening of the fuel lid 130 while invalidating the operation of opening by the fuel lid opener 133 is provided as described later, and the fuel lid 130 is allowed to open, when the mechanism is unlocked so as to make the operation of opening of the fuel lid opener 133 valid. By providing the fuel lid opener 133, the fuel lid 130 will never open unintentionally, unless otherwise the fuel lid opener 133 is operated, so that any unintentional opening of the fuel lid 130 typically during driving can be prevented.

As described in the above, since the leg shield is provided with the accommodation box 123 and the accommodation lid 125, the larger inner space of the leg shield is efficiently available for the utility space. Again referring now to FIG. 1B, the seat 110 is attached as being swingable around the supporting point provided in the vicinity of the front end thereof, and forms a housing portion in the lower portion thereof, as being surrounded by the side frame covers on both sides, and having a capacity larger than that of the accommodation box 123. The housing portion is opened and closed by swing operation of the seat 110, wherein a seat unlock mechanism 30 allowing opening of the seat 110 is provided thereto.

Next, a brief explanation will be given on an electronic authentication system provided to the scooter-type vehicle 100 of this embodiment. In the electronic authentication system, an authentication request signal is sent from the vehicle-borne control unit 10 through operation of an access switch 16, and outputs an authentication response signal containing ID information, which is an electronic personal identification information, from a portable electronic key 13 in response to the authentication response signal. The authentication response signal is then received by the vehicle-borne control unit 10, therein agreement of the ID information is judged, and operation of the vehicle is allowed upon judgment of the agreement. In other words, after identification code stored in the portable transmitter-receiver matches with identification code stored in the control unit, any vehicle operation is permitted.

Figure 5:
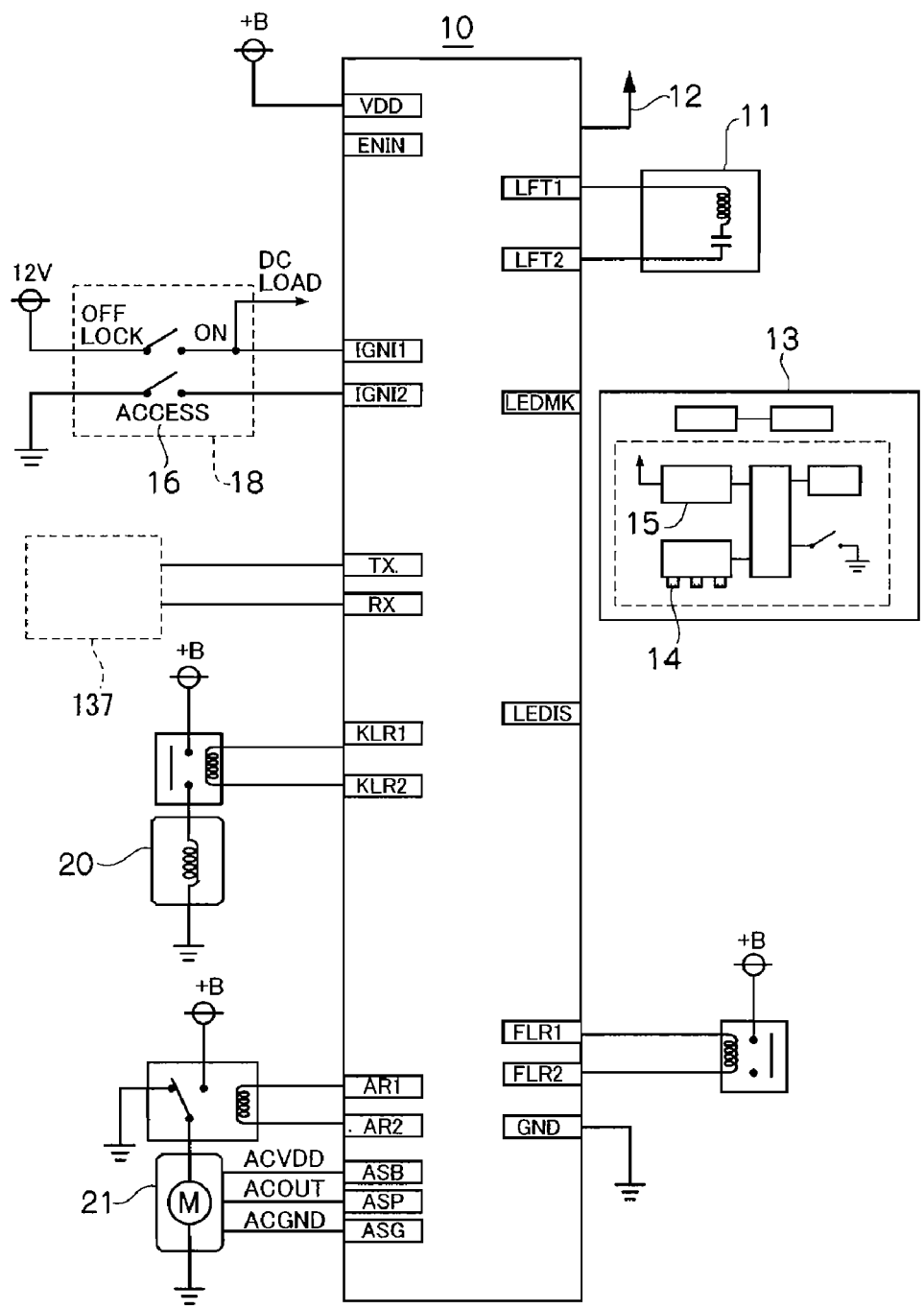
FIG. 5 is a drawing showing a system configuration of the electronic authentication device according to the embodiment of the present invention.
Figure 6A:
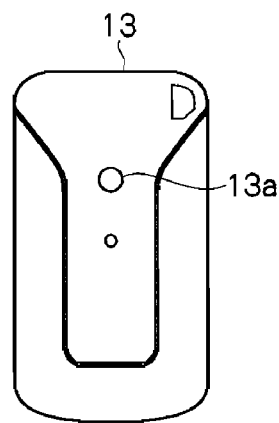
FIGS. 6A to 6C are drawings showing an exemplary configuration of an electronic key according to the embodiment of the present invention.
Figure 6B:
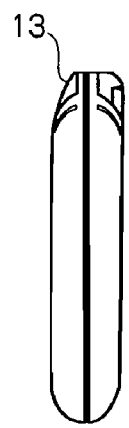
Figure 6C:
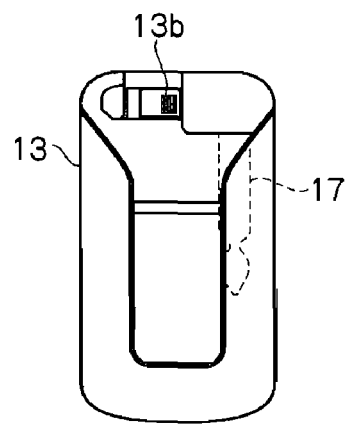

In the electronic authentication system, as shown in FIG. 5, the vehicle-borne control unit 10 is connected with a sending antenna 11 sending authentication request signals for electronic authentication, and a receiving antenna 12 receiving authentication response signals, and on the other hand, the electronic key 13 (see FIGS. 6A to 6C) has incorporated therein a transmitter-receiver which includes a receiving antenna 14 receiving the authentication request signals and a sending antenna 15 sending the authentication response signals. The electronic authentication system starts electronic authentication when an access switch 16 is turned ON. The authentication request signal is sent from the sending antenna 11, then received by the receiving antenna 14 of the electronic key 13, and the authentication response signal is sent from the sending antenna 15 in response to the authentication request signal. The authentication response signal is received by the vehicle-borne receiving antenna 12, and agreement of the ID information is judged by the vehicle-borne control unit 10. If the ID information agreed and the authorized electronic authentication was acquired, the operation of turning the ignition knob 19 of the ignition switch unit 18 described later, and the operation of opening the accommodation lid 125 and the fuel lid 130 are permitted.

The electronic key 13 has, as shown in FIG. 6, an operation button (or switch) 13a, wherein pressing the operation button 13a makes it possible to start or stop the electronic authentication function. In the period of inactivation of the electronic authentication function, any operation of the access switch 16, even while keeping the electronic key 13 within an area communicatable with the vehicle-borne control unit 10, will fail in acquiring the electronic authentication, because the electronic key 13 does not receive the authentication request signal from the vehicle-borne control unit 10.

As shown also in FIG. 4A, the ignition knob 19 (see FIG. 7) as an operator of the ignition switch unit 18 is provided above the accommodation box 123 and at a rightish position of the vehicle, as being appropriately projected out from the inner leg shield 113. The ignition switch unit 18 herein is provided nearly along the longitudinal direction of the vehicle in the space surrounded by the front leg shield 112, the inner leg shield 113 and the meter panel 120, as being extended to as close to the right end of the steering head pipe. The ignition knob 19 is configured so as to allow the turning operation and the pressing operation, wherein pressing of which makes it possible to effect ON operation of the access switch 16 of the ignition switch unit 18.

The electronic authentication system further has a solenoid 20 for locking and unlocking the lock mechanism 22 restricting turning of the ignition knob 19 as described later, and the actuator 21 for locking and unlocking the lock mechanisms 26, 27 restricting opening of the accommodation lid 125 and the fuel lid 130. The solenoid 20 and the actuator 21 are controlled in their operations by the vehicle-borne control unit 10.

Figure 7:
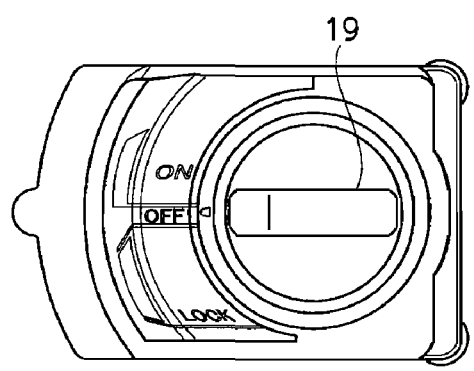
FIG. 7 is a drawing showing an exemplary configuration of the ignition knob according to the embodiment of the present invention.

The ignition knob 19 is configured, as shown in FIG. 7, as being positioned at "LOCK", "OFF" and "ON". It can be positioned also at an intermediate position between "OFF" and "ON" when it is turned under pressing (in the direction normal to the seat of drawing).

Figure 8:
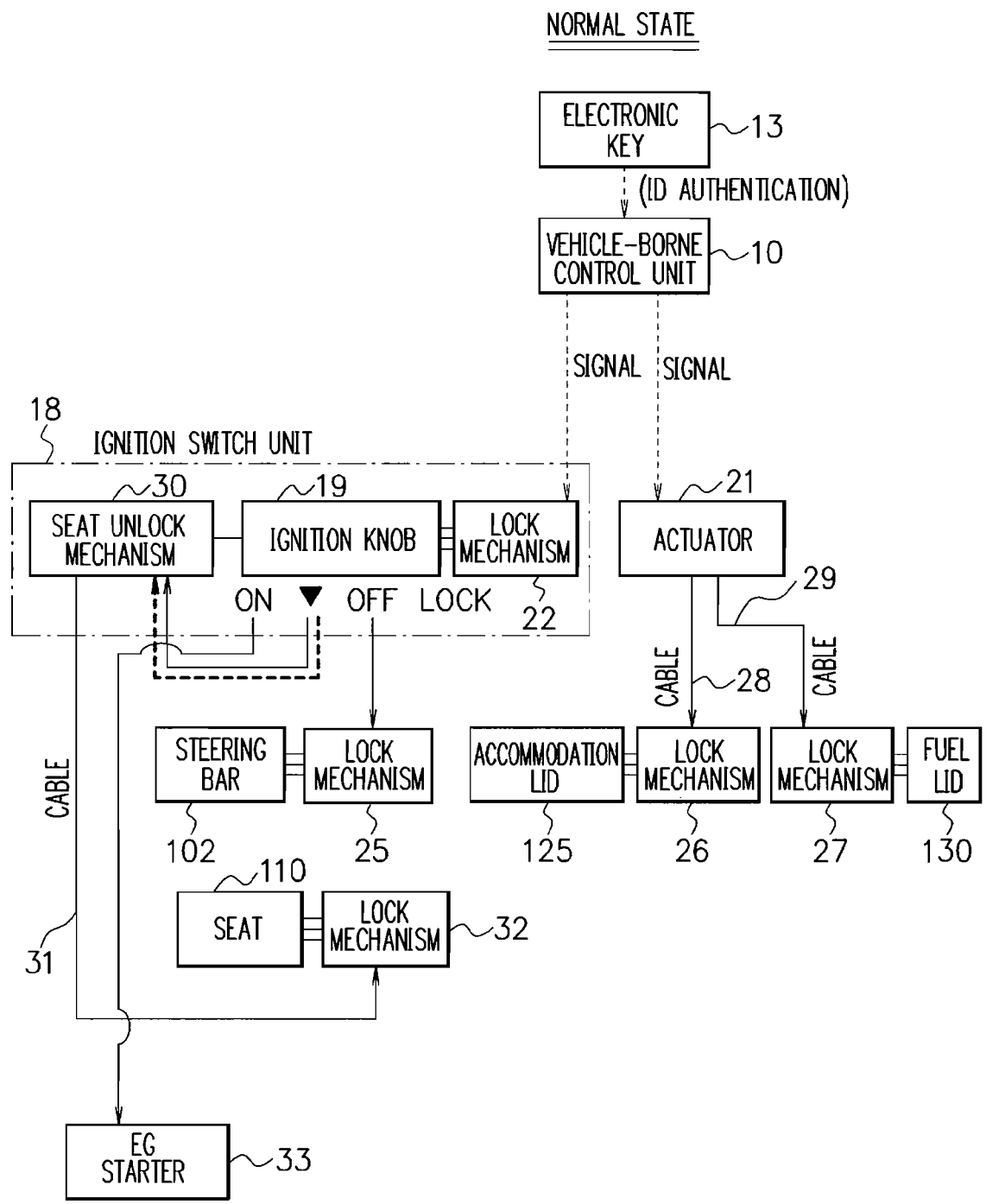
FIG. 8 is a drawing showing an exemplary system configuration according to the embodiment of the present invention.
Figure 9:
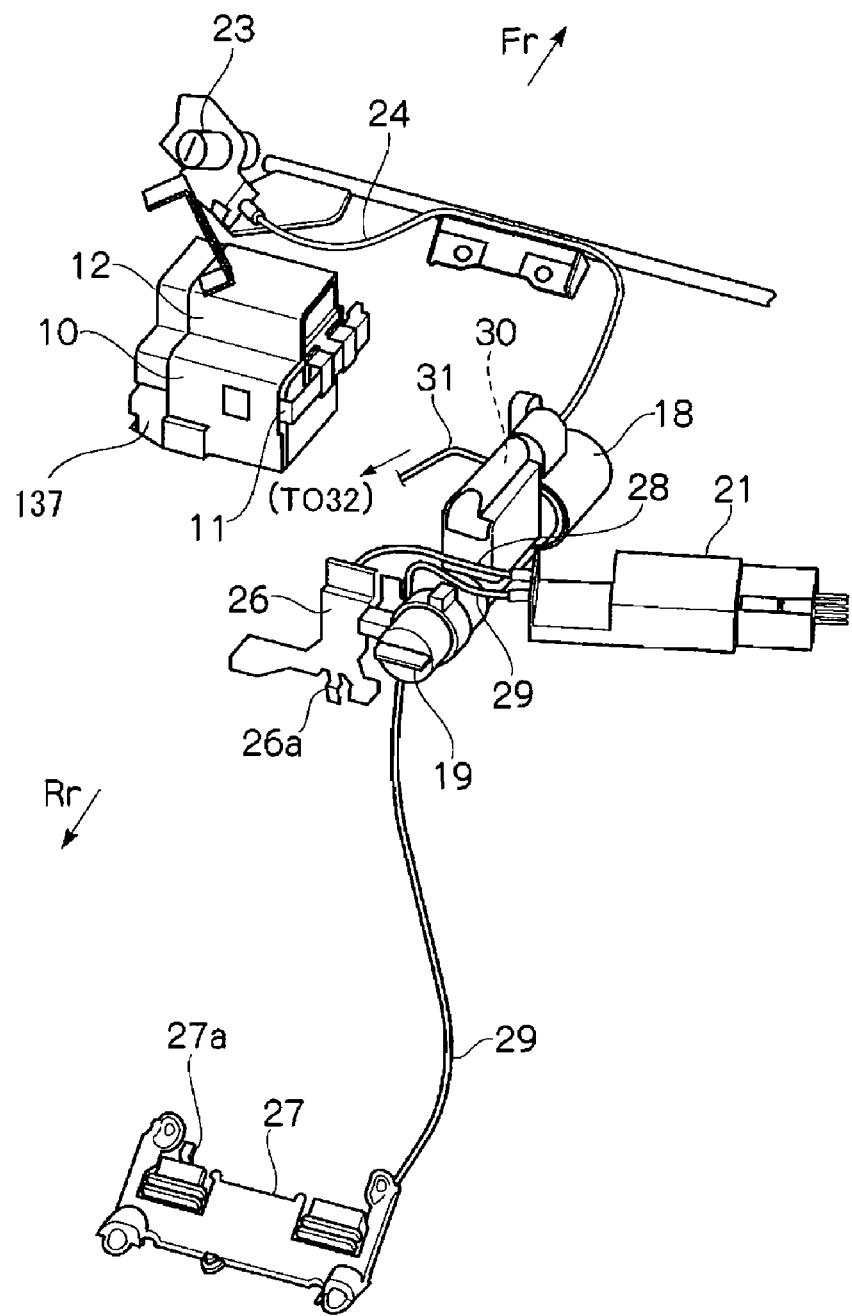
FIG. 9 is a drawing explaining an exemplary hardware configuration of the system according to the embodiment of the present invention.

Referring next to FIG. 8 and FIG. 9, the lock mechanism 22 of the ignition knob 19 is housed in a casing of the ignition switch unit 18, wherein the ignition knob 19 is locked at the "LOCK" or "OFF" position. The lock mechanism 22 is unlocked by activating the solenoid 20 (FIG. 5) with an electric signal generated from the vehicle-borne control unit 10, when the authorized electronic authentication was acquired, and thereby the operation of turning of the ignition knob 19 is permitted.

The ignition switch unit 18 is provided with, as being integrated therewith, a lock mechanism 25 restricting turning of the steering bar 102 coupled with the front folk 101. The lock mechanism 25 has a lock pin capable of advancing or regressing with respect to the steering axis of the front folk 101 supported by the steering head pipe typically as being triggered by the operation of turning the ignition knob 19, and can be unlocked after the authorized electronic authentication was acquired, by turning the ignition knob 19, for which the operation of turning was permitted, from the "LOCK" position to the "OFF" position (steering bar unlock position).

The lock mechanism 26 of the accommodation lid 125 is disposed on the left side and in the vicinity of the ignition switch unit 18. The lock mechanism 26 has a lock latch 26a, wherein the lock latch 26a is disposed at the opening 123a of the accommodation box 123 and engaged with the rear side (on the front side of the vehicle) of the accommodation lid 125. Engagement of the lock latch 26a with the accommodation lid 125 disables the operation of opening the accommodation lid opener 127. As shown also in FIG. 10, the lock mechanism 26 is connected through a cable 28 to the actuator 21. The actuator 21 has incorporated therein a motor as a driving power source, and has a slide piece 21a moving in a reciprocating manner (see the double-pointed arrow and two-dot chain line in FIG. 10), so as to push and pull the cable 28. The actuator 21 can effect locking or unlocking, by pulling the cable 28 as being mediated by the slide piece 21a, so as to move the lock latch 26a of the lock mechanism 26 forward and backward.

The lock mechanism 27 of the fuel lid 130 has a lock latch 27a, wherein the lock latch 27a is disposed at the opening 129 and engaged with the rear side of the fuel lid 130. Engagement of the lock latch 27a with the fuel lid 130 disables the operation of opening the fuel lid opener 133. The lock mechanism 27 is connected through a cable 29 to the actuator 21. The actuator 21 can effect locking or unlocking, by pulling the cable 29 as being mediated by the slide piece 21a, so as to move the lock latch 27a of the lock mechanism 27 forward or backward.

The above-described lock mechanisms 26, 27 of the accommodation lid 125 and the fuel lid 130 permit the operation of opening the accommodation lid 125 and the fuel lid 130 by allowing the actuator 21 to operate, when the authorized electronic authentication was acquired.

Figure 10:
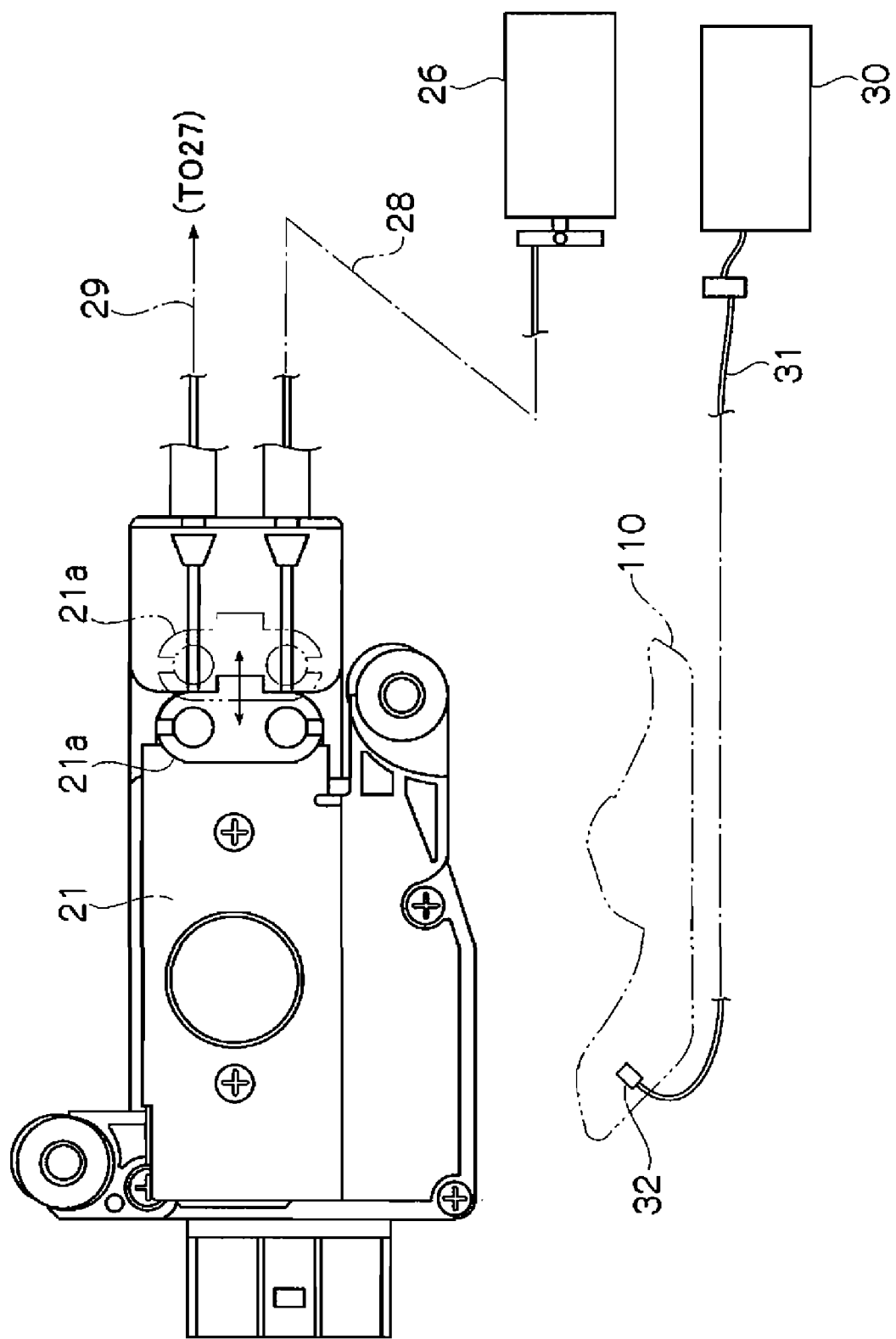
FIG. 10 is a drawing explaining an exemplary configuration of the actuator according to the embodiment of the present invention.

In this embodiment, the seat 110 is configured as being unlocked by turning the ignition knob 19. As shown in FIG. 8 and FIG. 10, the ignition switch unit 18 further has incorporated therein the seat unlock mechanism 30 unlocking the seat. The seat unlock mechanism 30 is connected with one end of a seat unlock cable 31, wherein the other end of the cable 31 is mechanically connected to the lock mechanism 32 (see FIG. 1A) of the seat 110.

The seat unlock mechanism 30 is activated when the steering bar is unlocked, and the ignition knob 19 is turned under pressing (turning operation with axial press) from the "OFF" position (handle unlocking position) to an intermediate position (▼: seat unlocking position) on the way to the "ON" position, and can thereby unlock the lock mechanism 32 of the seat 110.

The ignition knob 19 has, installed on the ignition switch unit 18, an automatic recovery mechanism, not shown, capable of steadily energizing the ignition knob 19 to rotate from the intermediate position (▼: seat unlocking position) to the "OFF" position (handle unlocking position). Because it is no more necessary to operate the ignition knob 19 once the seat is unlocked, the ignition knob 19 is configured as being returned to the "OFF" position with the aid of the automatic recovery mechanism, so as to save working hour for the operation.

The ignition knob 19 is also configured so as to bring the motorcycle into the engine starting operation standby state allowing activation of the engine through operation of an engine starter 33, by turning it from the "OFF" position (handle unlocking position) to the "ON" position without pressing.

With respect to the operation of turning the ignition knob 19 from the "OFF" position, a method of operation and the range of turning under pressing up to the intermediate position (▼) for the case of unlocking the seat are differed from a method of operation and the range of normal turning without pressing up to the "ON" position for the case of establishing the engine starting operation standby state.

As has been described in the above, the ignition knob 19 in this embodiment is configured as allowing two kinds of operations, which are the normal turning operation and the turning under axial pressing, in a single direction of turning.

Therefore, two functions can be allocated for the operation of turning in a single direction of turning, such as attaining the engine starting operation standby state by the normal operation of turning, whereas enabling unlock of the seat by the operation of turning under pressure.

By enabling the operation such as operation-under-pressing different from the normal operation of turning, the user is prevented from erroneously unlocking the seat. In addition, by making difference in the range of turning, the user can intuitively and readily understand what kind of operation he or she is engaged, and can be prevented from carrying out incorrect operation.

Figure 11:
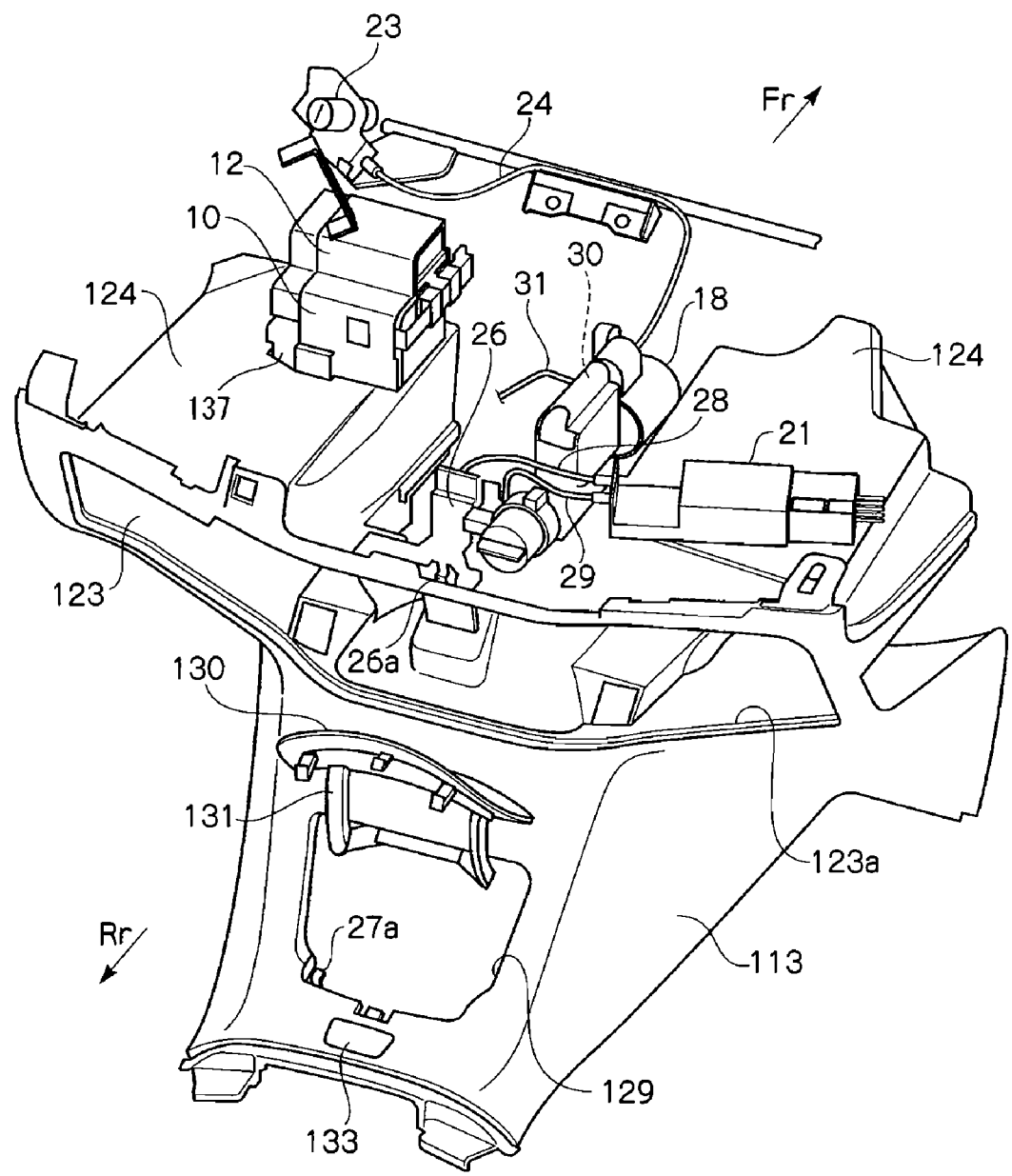
FIG. 11 is a perspective view showing the modularized leg shield and the peripherals according to the embodiment of the present invention.

As has been described in the above, the electronic authentication system of this embodiment includes the vehicle-borne control unit 10, the ignition switch unit 18, the lock mechanisms 26, 27 of the accommodation lid 125 and the fuel lid 130, and the actuator 21, wherein these constituents may be built up into a module, and mounted on the leg shield (inner leg shield 113) as shown in FIG. 11.

By making the electronic authentication system up into a module and preliminarily mounting it with the inner leg shield 113, assembly processes up into the vehicle are simplified to a considerable degree, and improved in the process efficiency to a large degree.

In this case, the vehicle-borne control unit 10 having the sending antenna 11 and the receiving antenna 12 integrated therein is disposed on the left side of the vehicle, where a prop stand is provided. In the actual use, the user of the vehicle often rides on the vehicle from the left side thereof towards which the vehicle inclines while being supported by the prop stand, so that the electronic key 13 carried by the user and the sending/receiving antennas of the vehicle-borne control unit 10 become more closer to each other, allowing downsizing of the transmitter/receiver.

Figure 12:
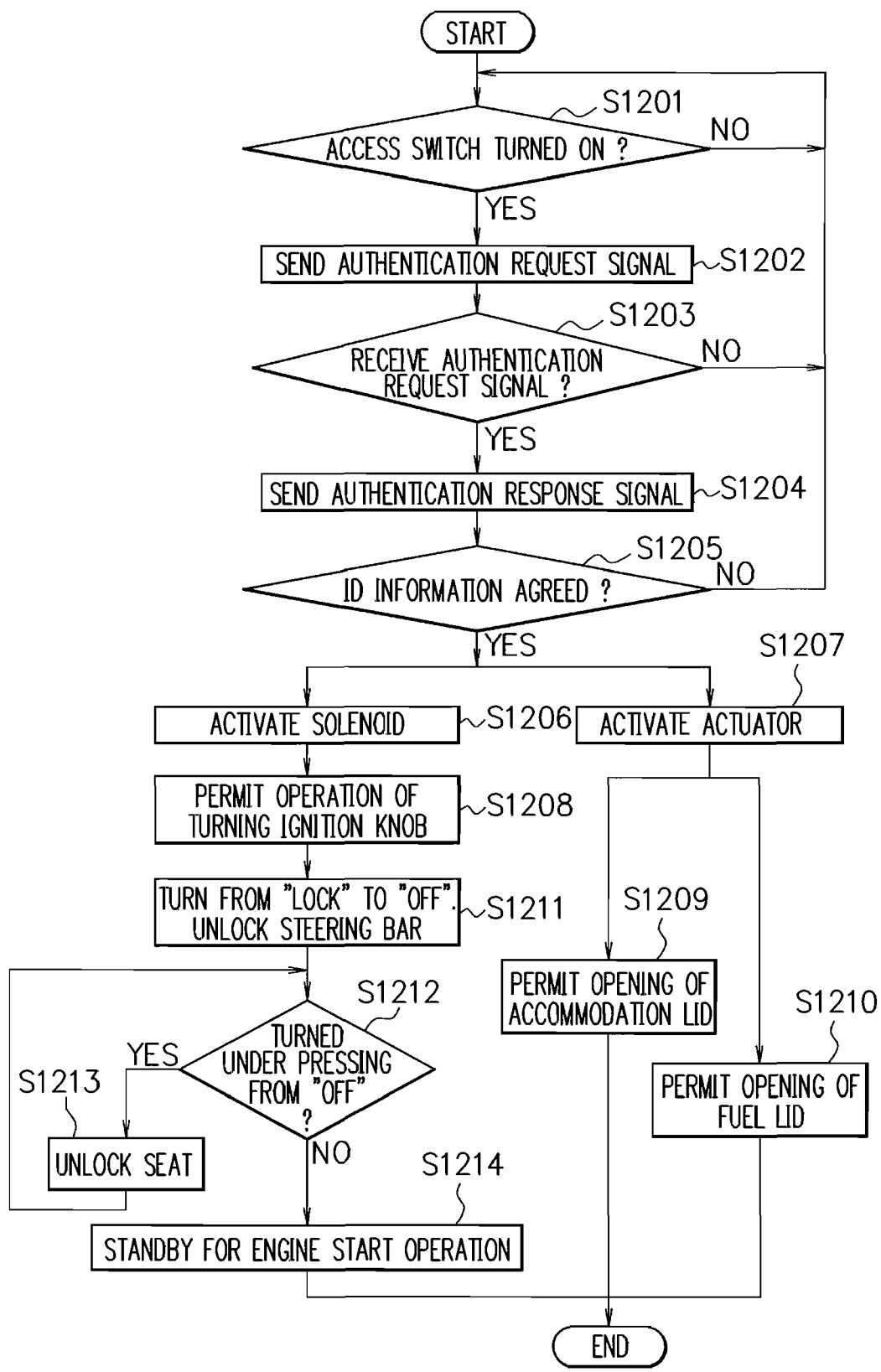
FIG. 12 is a flow chart explaining a process flow executed by the electronic authentication device and the user according to the embodiment of the present invention.

A flow of internal processes which take place in the electronic authentication devices (on the vehicle-borne and portable electronic key 13 sides) configured as described in the above, and carried out by the user will be explained referring to the flow chart shown in FIG. 12.

First in step S1201, the user carrying the electronic key 13 presses the ignition knob 19 to turn on the access switch 16, to thereby start the electronic authentication. When the access switch is not turned on, the standby mode establishes.

In step S1202, the authentication request signal is sent from the sending antenna 11 of the vehicle-borne control unit 10 to the electronic key 13.

In step S1203, the authentication request signal sent in step S1202 is received by the receiving antenna 14 of the electronic key 13. When the signal is not received, the process goes back to step S1201.

In step S1204, the electronic key 13 sends the authentication response signal from the sending antenna 15, in response to the authentication request signal.

In step S1205, the authentication response signal received by the receiving antenna 12 is judged by the vehicle-borne control unit 10 in terms of agreement of ID information, and if the authorized electronic authentication was acquired based on agreement of the ID information, the process advances to steps S1206 and S1207 so as to activate the solenoid 20 and the actuator 21.

In step S1206, upon activation of the solenoid 20, the process advances to step S1208, the lock mechanism 22 of the ignition knob 19 incorporated into the ignition switch unit 18 is unlocked, and thereby the operation of turning the ignition knob 19 is permitted.

In step S1207, upon activation of the actuator 21, the process advances to step S1209 and S1210, respectively, so as to allow the operation of opening the accommodation lid 125 and the fuel lid 130, and the process comes to the end.

The description in the above was made on the internal process of the electronic authentication device. Paragraphs below will explain a flow of operation by the user in step S1208 and thereafter.

If the operation of turning the ignition knob 19 is permitted in step S1208, the user first turns under pressing the ignition knob 19 from the "LOCK" position to the "OFF" position in step S1211, and thereby the lock mechanism 25 of the steering bar 102 is unlocked, and the steering bar is unlocked.

If the steering bar is unlocked in step S1211, the user further turns the ignition knob 19 from the "OFF" position in step S1212. In this case, if the ignition knob was turned under pressing to the intermediate position, the process advances to step S1213, thereby the lock mechanism 32 of the seat 110 is unlocked so as to allow open and close of the seat 110, and the process goes back to step S1212, with the aid of the automatic recovery mechanism. On the other hand, if the ignition knob was turned by the normal operation of turning without pressing to the "ON" position, the process advances to step S1214, and thereby the engine starting operation standby state is established, and the process comes to the end.

The description in the above dealt with flows of internal processes which take place in the electronic authentication device of this embodiment, and the operations by the user. In short, by activating the solenoid 20 with the electric signal sent from the vehicle-borne control unit 10, the lock mechanism 22 of the ignition knob 19 is unlocked, and thereby the ignition knob 19 is allowed to turn. By activating, in conjunction therewith, the actuator 21 with the electric signal sent from the vehicle-borne control unit 10, the lock mechanisms 26, 27 of the accommodation lid 125 and the fuel lid 130 are unlocked as being mediated by the cables 28, 29, and thereby the operations of opening are permitted. As a consequence, the accommodation lid 125 and the fuel lid 130 can be opened by operating the accommodation box lid opener 127 and the fuel lid opener 133, respectively.

After the electronic authentication was acquired, the unlocked ignition knob 19 is turned under pressing from the "LOCK" position to the "OFF" position, and thereby the steering bar 102 having been locked by the lock mechanism 25 is unlocked. After the steering bar was unlocked, by turning the ignition knob 19 from the "OFF" position further up to the "ON" position, the engine starting operation standby state can be established, the system can be brought into the engine starting operation standby state, in which the operation of starting the engine with the aid of the engine starter can be brought into standby.

If occasions demand, the lock mechanism 32 of the seat 110 may be unlocked. In this case, by turning under pressing the ignition knob 19 from the "OFF" position thereof to the intermediate position (▼), the lock mechanism 32 is unlocked while being mediated by the cable 31, and the seat 110 can be opened.

In short, according to the present invention, when the authorized electronic authentication was acquired, the operations of opening the accommodation lid 125 and the fuel lid 130 are permitted upon completion of the electronic authentication, and a series of succeeding operations only of the ignition knob 19 allows sequential unlocking of the steering bar and unlocking of the seat, without need of keeping the hands off.

Another embodiment of the present invention is further provided with an emergency unlocking device. It is to be noted that the basic configuration of this embodiment is substantially same as that in the embodiment described in the above, so that the description herein will mainly deal with characteristic portions of the further embodiment.

In this embodiment, as shown in FIG. 6, the electronic key 13 has an emergency unlock key 17 (mechanical key) as incorporated therein, wherein the emergency unlock key 17 is detachable through operation of a key lever 13b.

Referring next to FIG. 13 and FIG. 14, the lock mechanism 22 of the ignition knob 19 is incorporated in the casing of the ignition switch unit 18, and locks the ignition knob 19 to the "LOCK" or "OFF" position. The lock mechanism 22 is locked or unlocked, by activating the solenoid 20 (FIG. 5) by aid of the electric signal sent from the vehicle-borne control unit 10.

The lock mechanism 22 can be unlocked also by operating the emergency unlock key 17. In this embodiment, there is provided an emergency unlock key cylinder 23 operable by the emergency unlock key 17, wherein the key cylinder 23 is mechanically connected through an emergency unlock cable 24 to the lock mechanism 22.

In this embodiment, the accommodation lid 125 and the seat 110 can be unlocked also by the operation of turning the ignition knob 19. As shown in FIG. 13 and FIG. 14, the ignition switch unit 18 is further provided therein with the seat unlock mechanism 30 for unlocking. The seat unlock mechanism 30 is connected with one end of a seat unlock cable 31, wherein the other end of the cable 31 is branched into two ends and mechanically coupled with the lock mechanism 32 (see FIG. 1A) of the seat 110, and with the lock mechanism 26 of the accommodation lid 125, respectively.

The seat unlock mechanism 30 is activated when the ignition knob 19 is turned under pressing from the "OFF" position to the intermediate position (▼) on the way to the "ON" position, and can thereby unlock both of the lock mechanisms 26, 32 of the accommodation lid 125 and the seat 110. When the electronic authentication was acquired, the engine can be started by turning the ignition knob 19 from the "OFF" position to the "ON" position so as to operate the engine starter 33.

Figure 15A:
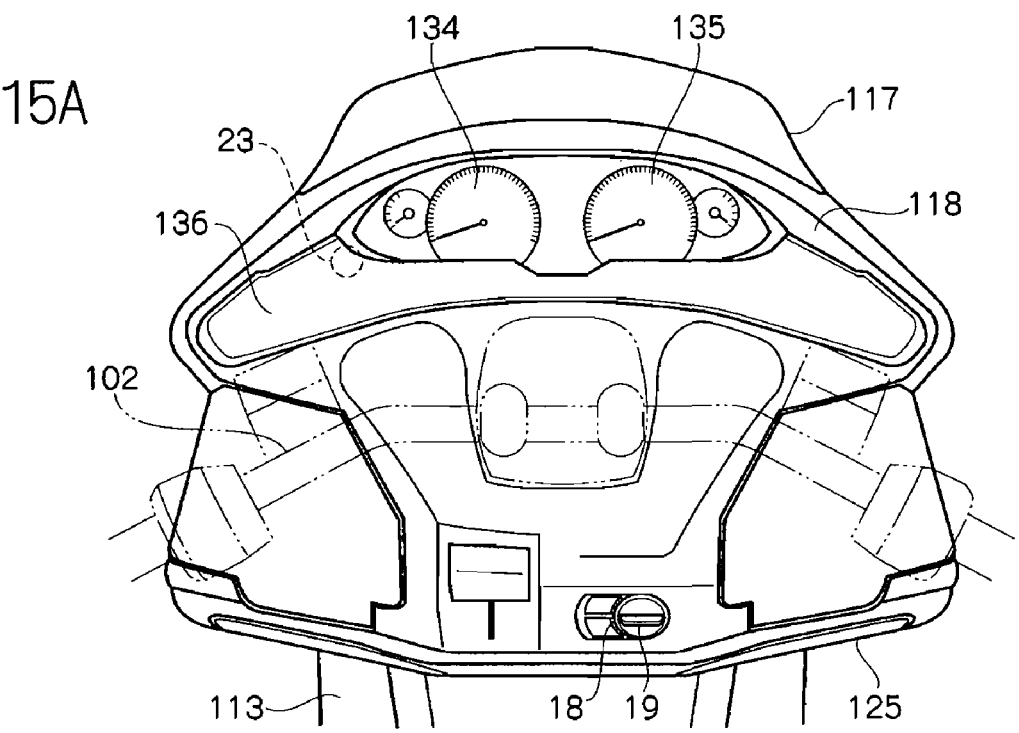
FIGS. 15A and 15B are plan views showing exemplary attachment of emergency unlock key cylinder according to the embodiments of the present invention.
Figure 15B:
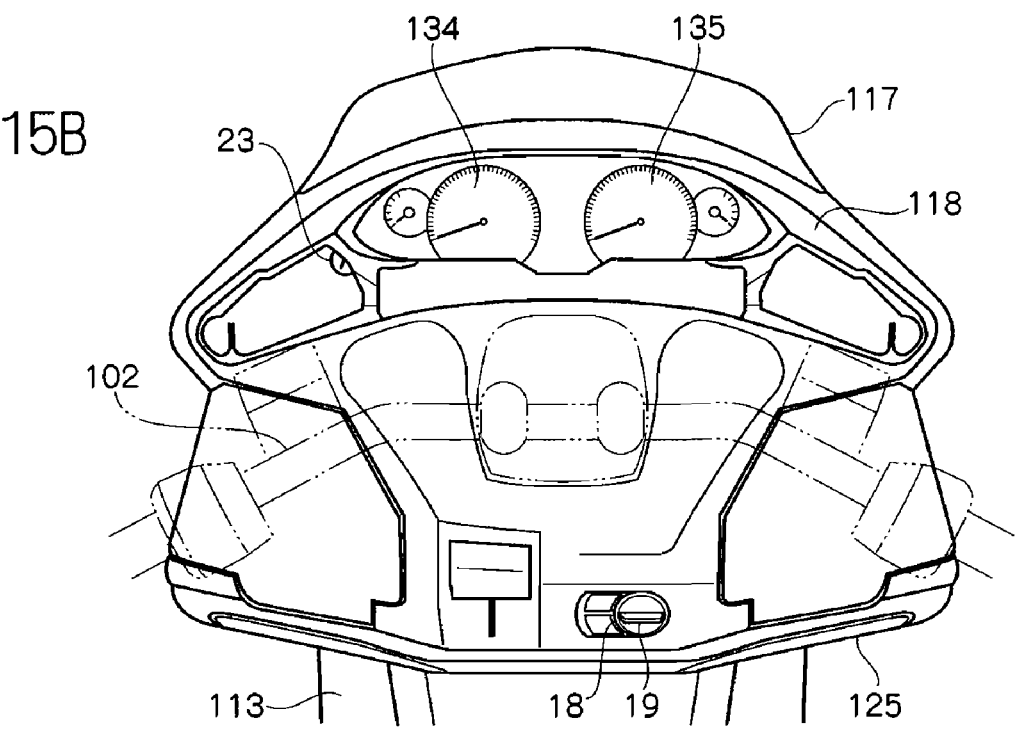

In the electronic authentication system of this embodiment, the emergency unlock key cylinder 23 operable with the emergency unlock key 17 is covered with a lid component (cover 136) detachable without using tools. More specifically, as shown in FIGS. 15A and 15B, a speedometer 134 and a tachometer 135 are mounted on a meter panel 118 disposed above the inner leg shield 113, and the cover 136 is attached to the front side (seat 110 side) thereof. The key cylinder 23 is disposed on the speedometer 134 side as shown in the drawing, and is covered with the cover 136 as the lid component, as being kept unexposed.

The key cylinder 23 can be exposed by removing the cover 136 as shown in FIG. 15B, allowing the operation with the emergency unlock key 17. The cover 136 herein can be attached as being clipped on the meter panel 118 in a readily detachable manner. In this case, a plurality of (four, for example) bosses are provided at near-regular intervals along the longitudinal direction of the cover 136, and the clip is molded to the end of each boss as being integrated therewith.

Operations and actions of authorized electronic authentication in this embodiment will be explained first, referring to FIG. 8. The access switch 16 is turned on when the user carrying the electronic key 13 presses the ignition knob 19, and the electronic authentication starts. The authentication request signal is sent from the sending antenna 11 of the vehicle-borne control unit 10, the authentication request signal is received by the receiving antenna 14 of the electronic key 13, and the authentication response signal is sent from the sending antenna 15 of the electronic key 13 in response to the authentication request signal. The authentication response signal received by the receiving antenna 12 of the vehicle-borne control unit 10 is judged by the vehicle-borne control unit 10 in terms of agreement of ID information, and if the authorized electronic authentication was acquired, the electric signal is output from the vehicle-borne control unit 10 to the lock mechanism 22 of the ignition knob 19, thereby the lock mechanism 22 is unlocked, and the operation of turning the ignition knob 19 is permitted.

Similarly, when the electronic authentication was acquired, the electric signal is concomitantly output from the vehicle-borne control unit 10 to the actuator 21, and the lock mechanisms 26, 27 of the accommodation lid 125 and the fuel lid 130 are unlocked as being mediated by the cables 28, 29, respectively. As a consequence, the accommodation lid 125 and the fuel lid 130 can be opened through operations of the accommodation box lid opener 127 and the fuel lid opener 133, respectively.

By turning under pressing the unlocked ignition knob 19 from the "LOCK" position to the "OFF" position, the steering bar 102 having been locked by the lock mechanism 25 is unlocked. After the steering bar was unlocked, the engine can be started by operating the engine starter 33, by further turning the ignition knob 19 from the "OFF" position to the "ON" position.

It is also allowable, if the occasions demand, to unlock the lock mechanism 32 of the seat 110 (and the lock mechanism 26 of the accommodation lid 125). In this case, the lock mechanism 32 can be unlocked as being mediated by the cable 31, by turning under pressing the ignition knob 19 from the "OFF" position to the intermediate position (▼). Because the lock mechanism 26 of the accommodation lid 125 has already been unlocked, the operation mediated by the cable 31 results in vain.

Paragraphs below will explain operations and actions of the emergency unlocking device. In this case, the key cylinder 23 can be exposed as shown in FIG. 15B, by detaching the cover 136 normally protecting the front side of the speedometer 134 as shown in FIG. 15A. The cover 136 herein can readily be detached. This state allows the operation using the emergency unlock key 17, wherein the lock mechanism 22 of the ignition knob 19 can be unlocked in a route different from the vehicle-borne control unit 10, by the operation using the emergency unlock key 17 and as being mediated by the cable 24.

Because the lock mechanism 22 of the ignition knob 19 is unlocked, the operation of turning the ignition knob 19 is permitted, so that the steering bar 102 locked by the lock mechanism 25 can be unlocked, by turning the ignition knob 19 from the "LOCK" position to the "OFF" position. Moreover, by turning under pressing the ignition knob 19 from the "OFF" position to the intermediate position (▼), the lock mechanisms 32, 26 of the seat 110 and the accommodation lid 125 are unlocked as being mediated by the cable 31. As a consequence, the seat 110 and the accommodation lid 125 can be opened.

In thus-configured emergency unlock system, the emergency unlock key cylinder 23 is provided on the vehicle side (motorcycle body), and any operation given on the emergency unlock key cylinder 23 is transmitted through the cable 24, so as to unlock the lock mechanism 22 of the ignition knob 19. As a consequence, the operation of turning the ignition knob 19 is permitted, making it possible to unlock the steering bar and the seat.

The operation of unlocking the seat is configured so that the operation of turning the ignition knob 19 is transmitted through the seat unlock cable 31, so as to unlock the lock mechanism 32 of the seat 110. The seat unlock cable 31 is coupled at one end thereof to the seat unlock mechanism 30 of the ignition switch unit 18, and is branched into two ends at the other end thereof, and mechanically connected to the lock mechanisms 32, 26 of the seat 110 and the accommodation lid 125, respectively.

On the other hand, when the seat is unlocked through the operation on the emergency unlock key cylinder 23, the actuator 21 is not driven because the electronic authentication has not been acquired, so that the lock mechanism 26 of the accommodation lid 125 can be unlocked only after the seat unlock cable 31 is pulled, and thereby the accommodation box lid opener 127 is allowed for the operation of opening.

In short, according to the present invention, when the authorized electronic authentication was acquired, the operations of opening the accommodation lid 125 and the fuel lid 130 are permitted upon completion of the electronic authentication, and the succeeding operations of the ignition knob 19 allows sequential unlocking of the steering bar and unlocking of the seat. In contrast, when the emergency unlock key 17 is used, the steering bar is unlocked after the operation of turning the ignition knob 19 is permitted, the seat is then unlocked by the operation of unlocking the seat, and at the same time the accommodation lid 125 is allowed for opening through the operation of opening by the accommodation box lid opener 127.

The emergency unlock key cylinder 23 is also given with the automatic recovery mechanism capable of steadily energizing it to the OFF-direction. This is because, without the automatic recovery mechanism, the lock mechanism 22 of the ignition knob 19 may undesirably be kept in the unlock position due to vibration during driving, so that the operation of turning the ignition knob 19 may be permitted even after the owner went apart from the vehicle and the system was inactivated. Because the operation of unlocking the seat using the emergency unlock key 17 needs operations of the ignition knob 19 and the accommodation box lid opener 127 using both hands at the same time, provision of a hold mechanism holding the emergency unlock key cylinder 23 at the position of ON-operation (emergency unlocking operation) enables the operations thereof, while allowing the user to keep his or her hands off from the emergency unlock key cylinder 23.

In addition, by making the emergency unlock key cylinder 23 unexposed while being shielded with the cover 136, the position of the key cylinder 23 is made more difficult to be found by the third party. The cover 136 is positioned on the front side of the meter, while aligning the longitudinal direction thereof with the width-wise direction of the vehicle, wherein in the space deep behind the cover 136, there are provided not only the emergency unlock key cylinder 23, but also a fuse box. The cover 136 is readily attachable and detachable to or from the vehicle cover in a clip-on manner.

Because the operation of turning the ignition knob 19 is permitted by the emergency unlock key 17, also the lock mechanism 25 of the steering bar 102 can be unlocked as a matter of course. Any other electronic authentication does not take place in this case, so that the engine cannot be started even if the engine start switch is turned on by moving the ignition knob 19 to the ignition "ON" position. It is therefore made possible to prevent theft by those having no authorized electronic key, and to prevent theft of fuel because the fuel lid 130 cannot be opened with the emergency unlock key 17.

On the other hand, the accommodation box 123 closed by the accommodation lid 125, and the commodity housing space under the seat 110 are made accessible through the operation using the emergency unlock key 17, so that it is made possible not only to recover the electronic authentication system by exchanging the battery, but also to secure the valuables prior to detaching operation of the battery. In particular, the accommodation box 123 closed by the accommodation lid 125 is often used for housing small matters such as a purse or a mobile phone, wherein the driver incapable of exchanging the battery can also call a repair staff by the mobile phone, or can take out the valuables such as the purse.

The present invention has been explained in the above referring to the embodiments, wherein it is to be noted that the present invention is by no means limited only to these embodiments, but allows any modifications within the scope of the present invention.

For example, the example explained in the above was such as disposing the emergency unlock key cylinder 23 in the vicinity of the meter panel 118 and so forth, and covering it with the cover 136, whereas the key cylinder 23 can also be disposed at any other appropriate portion of the leg shield.

Moreover, the present invention is also applicable to any other systems based on biological authentication making use of physical information capable of identifying the individuals, such as fingerprint, iris, voiceprint and so forth, in place of the system based on the electronic authentication using an identification code stored in the electronic key 13 and the vehicle-borne control unit 10.

What is claimed is:

1. An electronic authentication system for a motorcycle comprising:
   a portable transmitter-receiver carried by a user;
   a control unit installed on a motorcycle body; and
   an ignition switch unit provided with an ignition knob and an access switch, the ignition switch unit electrically connected with the control unit,
   wherein an axial pressing operation of the ignition knob activates the access switch to begin an electronic authentication, the electronic authentication comprising matching both identification information stored in the portable transmitter-receiver and the control unit respectively;
   wherein the control unit permits the ignition knob to be rotated from a handle locking position and enables an accommodation box lid to be opened in consequence of the electronic authentication,
   wherein the ignition switch unit causes a handle to be unlocked in consequence of rotating the ignition knob in a first rotating direction from the handle locking position to a handle unlocking position with an axial pressing operation thereof following the electronic authentication,
   wherein the ignition switch unit causes a seat to be unlocked in consequence of further rotating the ignition knob in the first rotating direction from the handle unlocking position to a seat unlocking position with the axial pressing operation thereof following the handle unlocking operation,
   wherein the control unit causes the motorcycle to be an engine startup standby state in consequence of further rotating the ignition knob in the first rotating direction from the handle unlocking position to an engine startup standby position without the axial pressing operation thereof from the handle unlocking position to the engine startup position,
   wherein the ignition switch unit is provided with an automatic recovery mechanism steadily energizing the ignition knob to rotate in a second rotating direction opposite to the first rotating direction from the seat unlocking position toward the handle unlocking position, and
   wherein a range of rotating the ignition knob with the axial pressing operation to the seat unlocking position is differed from a range of rotating the ignition knob without the axial pressing operation to the engine startup standby position.

2. The electronic authentication system for a motorcycle according to claim 1, further comprising:
a solenoid for locking and unlocking a first lock mechanism, the first lock mechanism restricting turning of the ignition knob; and
an actuator for locking and unlocking a second lock mechanism, the second lock mechanism restricting opening of the accommodation box lid,
wherein the solenoid and the actuator are controlled by the control unit so as to unlock the first and second lock mechanisms respectively in consequence of the electronic authentication.

3. The electronic authentication system for a motorcycle according to claim 1, wherein the control unit further permits a fuel lid to be opened in consequence of the electronic authentication.

4. The electronic authentication system for a motorcycle according to claim 1, further comprising an emergency unlocking device including a mechanical key, a key cylinder installed on the motorcycle body and a cable connecting the key cylinder and a lock mechanism for locking/unlocking the rotation of the ignition knob,
wherein the emergency unlocking device permits the ignition knob to be rotated from the handle locking position in consequence of the emergency unlocking operation without authentication.

5. The electronic authentication system for a motorcycle according to claim 4, wherein the ignition switch unit causes a handle to be unlocked in consequence of rotating the ignition knob from the handle locking position to a handle unlocking position with axial pressing operation thereof under an emergency unlocked state.

6. The electronic authentication system for a motorcycle according to claim 5, wherein the ignition switch unit causes a seat to be unlocked in consequence of further rotating the ignition knob from the handle unlocking position to a seat unlocking position with axial pressing operation thereof following the handle unlocking operation under the emergency unlocked state.

7. The electronic authentication system for a motorcycle according to claim 6, wherein the ignition switch unit enables an accommodation box lid to be opened concurrently with the seat unlocking operation.

8. The electronic authentication system for a motorcycle according to claim 7, further comprising a seat unlocking cable having one end coupled with the ignition knob, and the other end branched into two ends, wherein one of the branched two ends couples with a lock mechanism for the seat and the other of the branched two ends couples with a lock mechanism for the accommodation box lid respectively.

9. The electronic authentication system for a motorcycle according to claim 4, further comprising:
an automatic recovery mechanism steadily energizing the key cylinder to rotate in the direction toward a disabling position of the emergency unlocking device; and
a holding mechanism holding the key cylinder to be an emergency unlocking position.

* * * * *